United States Patent
Watanabe et al.

(10) Patent No.: US 10,656,115 B2
(45) Date of Patent: May 19, 2020

(54) CONTROLLER AND ABNORMALITY DETECTING METHOD OF AIR-FUEL-RATIO SENSOR

(71) Applicants: FUJITSU TEN LIMITED, Kobe-shi, Hyogo (JP); TOYOTA JIDOSHA KABUSHIKI KAISHA, Toyota-shi, Aichi-ken (JP)

(72) Inventors: Masatoshi Watanabe, Kobe (JP); Shigeto Umeyama, Kobe (JP); Satoshi Noguchi, Kobe (JP); Motoki Komiya, Kobe (JP); Keisuke Kido, Kobe (JP); Hiroto Miura, Toyota (JP)

(73) Assignees: FUJITSU TEN LIMITED, Kobe-shi (JP); TOYOTA JIDOSHA KABUSHIKI KAISHA, Toyota (JP)

(*) Notice: Subject to any disclaimer, the term of this patent is extended or adjusted under 35 U.S.C. 154(b) by 106 days.

(21) Appl. No.: 15/617,755

(22) Filed: Jun. 8, 2017

(65) Prior Publication Data
US 2018/0024093 A1 Jan. 25, 2018

(30) Foreign Application Priority Data
Jul. 19, 2016 (JP) .................................. 2016-141883

(51) Int. Cl.
*G01N 27/416* (2006.01)
*G01N 27/406* (2006.01)
(Continued)

(52) U.S. Cl.
CPC ..... *G01N 27/4163* (2013.01); *F02D 41/1454* (2013.01); *F02D 41/1495* (2013.01);
(Continued)

(58) Field of Classification Search
CPC ........... G01N 27/4175; G01N 27/4067; G01N 27/4073; G01N 27/4077; G01N 27/41;
(Continued)

(56) References Cited

U.S. PATENT DOCUMENTS 7,713,391 B2 * 5/2010 Inoue .................. F02D 41/1494
123/688
8,268,147 B2 * 9/2012 Ieda .................... G01N 27/4065
123/688
(Continued)

FOREIGN PATENT DOCUMENTS

| CN | 1800843 A | 7/2006 |
|----|-----------|--------|
| JP | 2005-291991 A | 10/2005 |
| JP | 2010-256233 A | 11/2010 |

*Primary Examiner* — Gurpreet Kaur
(74) *Attorney, Agent, or Firm* — Oliff PLC

(57) ABSTRACT

A controller of an air-fuel-ratio sensor according to an embodiment includes a current supplying unit, a sweep processing unit, and an abnormality detecting unit. The current supplying unit supplies a current to the pump cell through a first terminal connected with the pump cell so as to control the pump cell. The sweep processing unit executes a sweeping process in which a predetermined voltage or a predetermined current is applied to the detection cell through a second terminal connected with the detection cell so as to change a voltage and a current of the detection cell. The abnormality detecting unit detects a short-circuited state between the first terminal and the second terminal on the basis of a fluctuation in a voltage or a current, generated by the sweeping process, of the first terminal.

5 Claims, 6 Drawing Sheets

(51) Int. Cl.
  *G01N 27/407* (2006.01)
  *G01N 27/41* (2006.01)
  *F02D 41/14* (2006.01)
  *G01N 27/417* (2006.01)

(52) U.S. Cl.
  CPC ..... *G01N 27/4067* (2013.01); *G01N 27/4073* (2013.01); *G01N 27/4075* (2013.01); *G01N 27/4077* (2013.01); *G01N 27/41* (2013.01); *G01N 27/4175* (2013.01); *F01N 2560/025* (2013.01)

(58) Field of Classification Search
  CPC ............ G01N 27/4163; G01N 27/4075; F02D 41/1495; F02D 41/1454; F02D 41/123; F02D 41/1483; F02D 41/1461; F02D 41/1474; F02D 41/146; F02D 41/1455; F02D 41/1496; F02D 41/1494; F02D 41/1444; F02D 41/30; F01N 2560/025
  See application file for complete search history.

(56) References Cited

U.S. PATENT DOCUMENTS

| | | | |
|---|---|---|---|
| 2004/0217001 A1 | 11/2004 | Hada et al. | |
| 2004/0222094 A1 | 11/2004 | Ieda et al. | |
| 2005/0029250 A1* | 2/2005 | Niwa | F02D 41/1494 219/494 |
| 2005/0217347 A1* | 10/2005 | Kawase | G01N 27/4175 73/23.31 |
| 2008/0060939 A1* | 3/2008 | Inoue | G01N 27/4175 204/401 |
| 2009/0056414 A1* | 3/2009 | Matsuoka | G01N 33/0037 73/23.32 |
| 2017/0342933 A1* | 11/2017 | Kamiya | F02D 41/021 |

* cited by examiner

CONTROLLER AND ABNORMALITY DETECTING METHOD OF AIR-FUEL-RATIO SENSOR

CROSS-REFERENCE TO RELATED APPLICATION

This application is based upon and claims the benefit of priority of the prior Japanese Patent Application No. 2016-141883, filed on Jul. 19, 2016, the entire contents of which are incorporated herein by reference.

FIELD

The embodiment discussed herein is directed to a controller and an abnormality detecting method of an air-fuel-ratio sensor.

BACKGROUND

There is widely known a feedback control that brings an air-fuel ratio, which is a ratio between air and fuel in an exhaust gas exhausted from an internal-combustion engine, close to a target air-fuel ratio so as to improve fuel efficiency of a vehicle, and this air-fuel ratio is detected by an air-fuel-ratio sensor (A/F sensor).

As for an air-fuel-ratio sensor, there is known an air-fuel-ratio sensor that includes a gas sensor element in which a pump cell and a detection cell are provided and a controller controlling this gas sensor element. With regard to this air-fuel-ratio sensor, when an abnormality such as a short circuit between the pump cell and the detection cell occurs, reliable detection of an air fuel ratio becomes difficult. Therefore, there is proposed a technology that detects an occurrence of an abnormality of a short circuit between the pump cell and the detection cell (for example, Japanese Laid-open Patent Publication No. 2005-291991).

However, the aforementioned conventional technology has a fear that an abnormality of a short circuit between the pump cell and the detection cell is not detected with high accuracy.

SUMMARY

According to an aspect of an embodiment, a controller of an air-fuel-ratio sensor includes a current supplying unit, a sweep processing unit, and an abnormality detecting unit. The current supplying unit supplies a current to the pump cell through a first terminal connected with the pump cell so as to control the pump cell. The sweep processing unit executes a sweeping process in which a predetermined voltage or a predetermined current is applied to the detection cell through a second terminal connected with the detection cell so as to change a voltage and a current of the detection cell. The abnormality detecting unit detects a short-circuited state between the first terminal and the second terminal on the basis of a fluctuation in a voltage or a current, generated by the sweeping process, of the first terminal.

BRIEF DESCRIPTION OF DRAWINGS

A more complete appreciation of the disclosed technology and many of the attendant advantages thereof will be readily obtained as the same becomes better understood by reference to the following detailed description when considered in connection with the accompanying drawings, wherein.

DESCRIPTION OF EMBODIMENT

Hereinafter, an embodiment of a controller and an abnormality detecting method of an air-fuel-ratio sensor (A/F sensor) according to the present disclosure will be specifically explained with reference to the accompanying drawings. Moreover, the disclosed technology is not limited to the embodiment described below.

1. Configuration of Air-Fuel-Ratio Sensor

Figure 1:
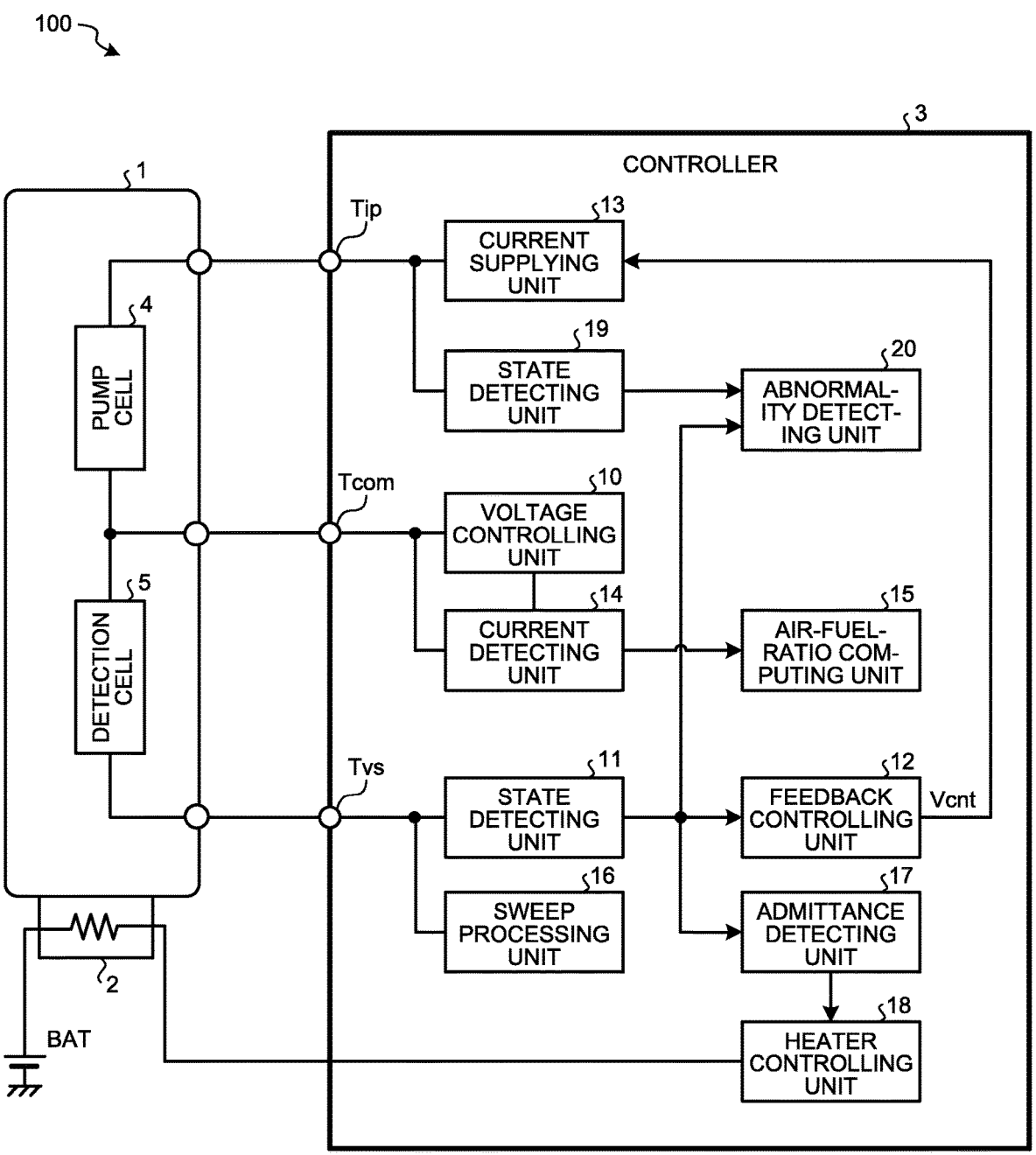
FIG. 1 is a diagram illustrating a configuration example of an air-fuel-ratio sensor according to an embodiment.

FIG. 1 is a diagram illustrating a configuration example of an air-fuel-ratio sensor according to the embodiment. As illustrated in FIG. 1, an air-fuel-ratio sensor 100 includes a gas sensor element 1, a heater 2, and a controller 3 so as to detect, for example, an oxygen concentration (air fuel ratio) in an exhaust gas.

The gas sensor element 1 includes a pump cell 4 that pumps and pumps out oxygen into and from a gas detecting chamber (not illustrated) and a detection cell 5 for detecting an oxygen concentration of the gas detecting chamber. To the gas sensor element 1, the heater 2 that is controlled by the controller 3 is attached, and the gas sensor element 1 is heated by this heater 2.

The controller 3 includes an IP terminal Tip (one example of "first terminal"), a COM terminal Tcom, a VS terminal Tvs (one example of "second terminal"), a voltage controlling unit 10, state detecting units 11 and 19, a feedback controlling unit 12, a current supplying unit 13, a current detecting unit 14, an air-fuel-ratio computing unit 15, a sweep processing unit 16, an admittance detecting unit 17, a heater controlling unit 18, and an abnormality detecting unit 20.

The voltage controlling unit 10 outputs a voltage so that a voltage Vcom (hereinafter, may be referred to as "COM voltage Vcom") of the COM terminal Tcom is a constant voltage. The state detecting unit 11 detects an instantaneous value of a voltage Vs (hereinafter, may be referred to as "VS voltage Vs") of the VS terminal Tvs and an instantaneous value (hereinafter, may be referred to as "VS current Is") of a current Is of the VS terminal Tvs.

The feedback controlling unit 12 performs a feedback control that outputs a control voltage Vcnt according to the VS voltage Vs to the current supplying unit 13. The current supplying unit 13 supplies a current according to the control voltage Vcnt from the IP terminal Tip to the pump cell 4 of the gas sensor element 1 so as to control pumping and pumping out oxygen into and from the gas detecting chamber (not illustrated) by the pump cell 4.

The current detecting unit 14 detects an instantaneous value (hereinafter, may be referred to as "IP current IP") of a current Ip that flows between the IP terminal Tip and the COM terminal Tcom. The air-fuel-ratio computing unit 15 computes an air fuel ratio (hereinafter, may be referred to as "A/F value") on the basis of the IP current IP.

The sweep processing unit 16 executes a sweeping process in which a constant current Im (hereinafter, may be referred to as "sweeping current Im") or a constant voltage Vm (hereinafter, may be referred to as "sweeping voltage Vm") is applied from the VS terminal Tvs to the detection cell 5, so as to change a voltage and a current of the detection cell 5.

The admittance detecting unit 17 obtains, on the basis of the VS voltage Vs or the VS current Is output from the state detecting unit 11, a change amount $\Delta V1$ of the VS voltage Vs or a change amount $\Delta I1$ of the VS current Is generated by the application of the sweeping current Im or the sweeping voltage Vm to the detection cell 5. The admittance detecting unit 17 detects a value (hereinafter, may be referred to as "admittance Y") of an admittance of the detection cell 5 on the basis of the change amount $\Delta V1$ or the change amount $\Delta I1$.

The heater controlling unit 18 controls a power amount to be supplied to the heater 2 in accordance with the admittance Y so as to turn the gas sensor element 1 into an activated state. The state detecting unit 19 detects an instantaneous value (hereinafter, may be referred to as "IP voltage Vp") of a voltage Vp of the IP terminal Tip or an instantaneous value (hereinafter, may be referred to as "IP current Ip") of the current Ip.

The abnormality detecting unit 20 determines whether or not a short circuit has occurred between the IP terminal Tip and the VS terminal Tvs (hereinafter, may be referred to as "between IP-VS") on the basis of a fluctuation in the IP voltage Vp or the IP current Ip generated by a sweeping process, in other words, an application of the sweeping current Im or the sweeping voltage Vm to the detection cell 5.

For example, when a fluctuation in the IP voltage Vp or the IP current Ip generated by a sweeping process is a predetermined value or more, the abnormality detecting unit 20 determines that a short circuit has occurred between IP-VS. Thus, an abnormality of a short circuit between the pump cell 4 and the detection cell 5 can be detected with high accuracy.

The abnormality detecting unit 20 may determine whether or not a short circuit has occurred between IP-VS on the basis of a fluctuation in the VS voltage Vs or the VS current Is generated by a sweeping process, in addition to the fluctuation in the IP voltage Vp or the IP current Ip generated by the sweeping process. Thus, an abnormality of a short circuit between the pump cell 4 and the detection cell 5 can be detected with higher accuracy.

2. First Configuration Example of Air-Fuel-Ratio Sensor

Figure 2:
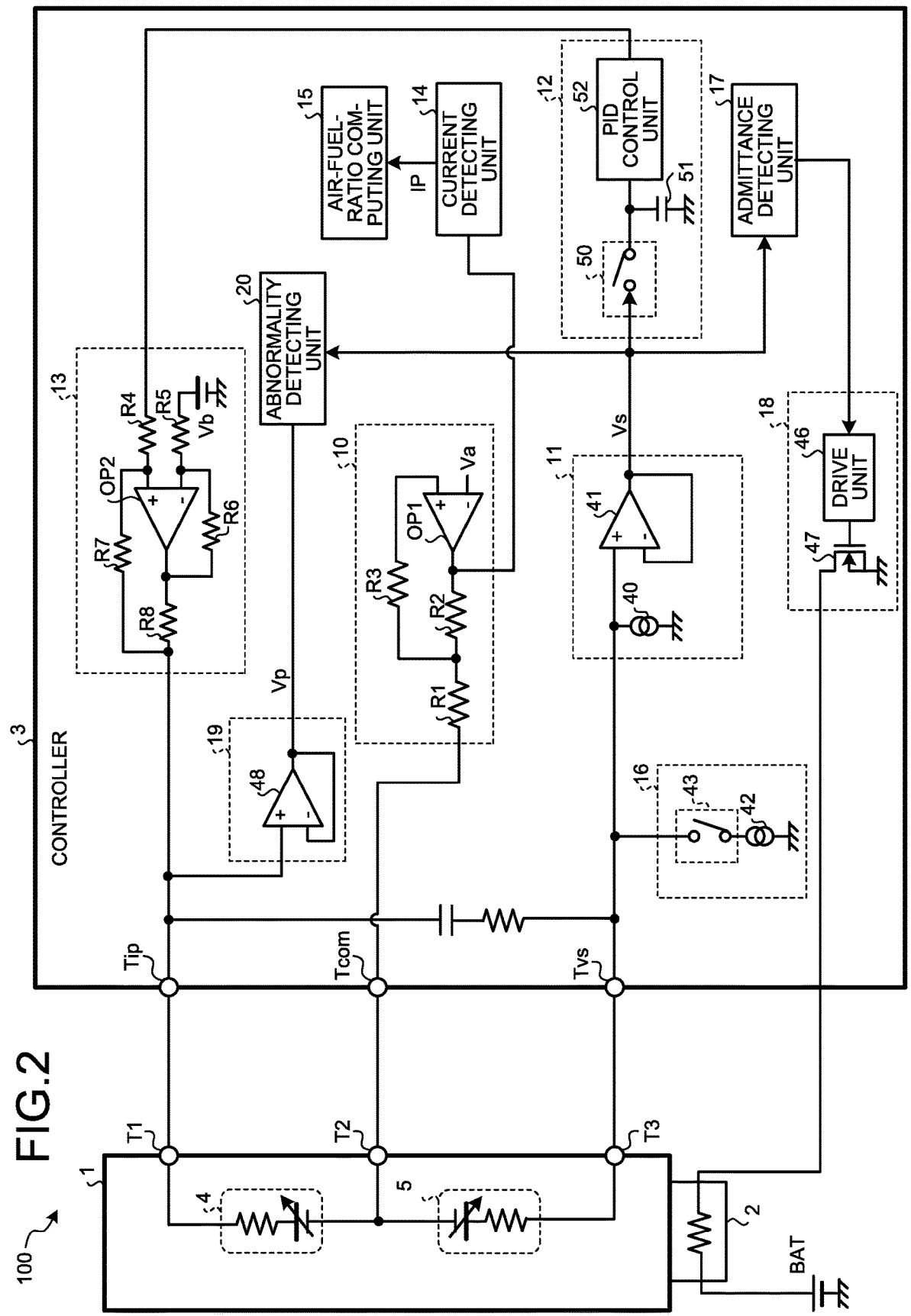
FIG. 2 is a diagram illustrating a first configuration example of the air-fuel-ratio sensor illustrated in FIG. 1.
Figure 3:
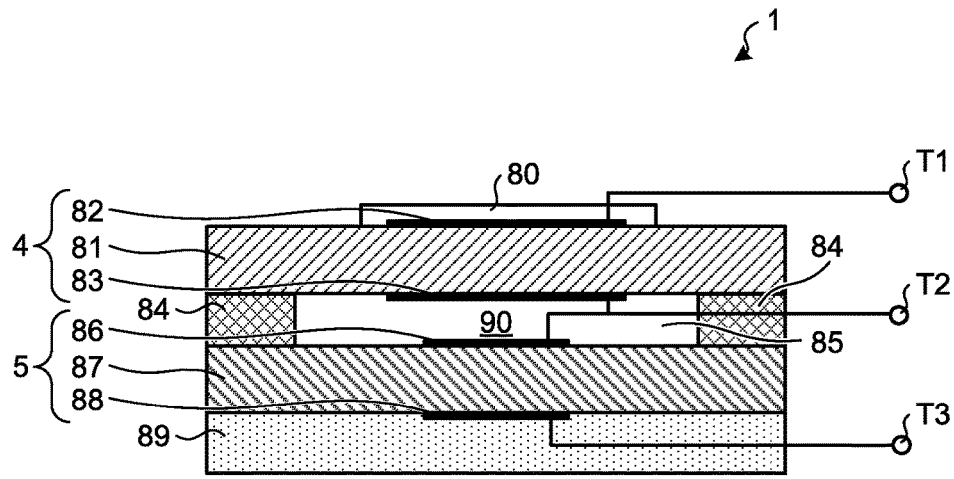
FIG. 3 is a diagram illustrating a configuration example of a gas sensor element.

Next, one example of a first configuration of the air-fuel-ratio sensor 100 illustrated in FIG. 1 will be explained. FIG. 2 is a diagram illustrating a first configuration example of the air-fuel-ratio sensor 100 illustrated in FIG. 1, and FIG. 3 is a diagram illustrating a configuration example of the gas sensor element 1. The controller 3 of the air-fuel-ratio sensor 100 is arranged in, for example, an Electronic Control Unit (ECU) provided in a vehicle, and the gas sensor element 1 is arranged in, for example, an exhaust pipe of an internal-combustion engine of the vehicle.

2.1. Configuration Example of Gas Sensor Element

First, a configuration example of the gas sensor element 1 will be explained with reference to FIG. 3. The gas sensor element 1 is, for example, a universal air-fuel-ratio gas sensor element, and, as illustrated in FIG. 3, has a configuration in which a solid electrolyte body 81, an insulating substrate 85, and solid electrolyte bodies 87 and 89 are sequentially laminated in this order.

The solid electrolyte bodies 81, 87, and 89 are solid electrolyte bodies having the oxygen ion conductivity, and are formed by adding, for example, yttria ($Y2O3$) to zirconia ($ZrO2$). The insulating substrate 85 is made by, for example, alumina and the like.

A gas detecting chamber 90 is formed in the insulating substrate 85, and diffusion controlling units 84, which are porous, are arranged at respective both ends of this gas detecting chamber 90 so as to control an inflow of an exhaust gas into the gas detecting chamber 90.

The pump cell 4 includes the solid electrolyte body 81 and electrodes 82 and 83 that are formed out of porous platinum on respective both surfaces of this solid electrolyte body 81 so as to pump and pump out oxygen into and from the gas detecting chamber 90 in accordance with a magnitude and a direction of a current that is supplied between the electrodes 82 and 83. The electrode 82 is protected by, for example, a protection layer 80 having porous characteristics.

The detection cell 5 includes a solid electrolyte body 87 and electrodes 86 and 88 that are formed out of porous platinum on respective both surfaces of this solid electrolyte body 87. When a constant current Icp is supplied between the electrodes 86 and 88, an electromotive force according to an oxygen concentration in the gas detecting chamber 90 is to be generated between the electrodes 86 and 88.

As illustrated in FIG. 2, the heater 2 is attached to the gas sensor element 1, and the gas sensor element 1 is activated by heat from this heater 2. The heater 2 includes, for example, a ceramic heater, and heater wiring is provided therein.

2.2. Configuration Example of Controller

Next, a configuration example of the controller 3 illustrated in FIG. 2 will be explained. The controller 3 is realized by an integrated circuit such as an Application Specific Integrated Circuit (ASIC) and a Field Programmable Gate Array (FPGA). The controller 3 may be configured so that a part or all of computing processes thereof are executed by a Central Processing Unit (CPU).

As described above, the controller 3 includes the IP terminal Tip, the COM terminal Tcom, the VS terminal Tvs, the voltage controlling unit 10, the state detecting units 11 and 19, the feedback controlling unit 12, the current supplying unit 13, the current detecting unit 14, the air-fuel-ratio computing unit 15, the sweep processing unit 16, the admittance detecting unit 17, the heater controlling unit 18, and the abnormality detecting unit 20.

The IP terminal Tip is connected with one end of the pump cell 4, the COM terminal Tcom is connected with the other end of the pump cell 4 as well as one end of the detection cell 5, and the VS terminal Tvs is connected with the other end of the detection cell 5.

2.2.1. Voltage Controlling Unit

The voltage controlling unit 10 outputs a voltage so that a voltage of a terminal T2 of the gas sensor element 1 is a constant voltage Va (for example, 3.3 [V]). This voltage controlling unit 10 includes an operational amplifier OP1 and resistances R1 to R3, and operates so that a voltage at a connection point between the resistance R1 and the resistance R2 is the constant voltage Va so as to supply the constant voltage Va to the COM terminal Tcom through the resistance R1. A voltage drop of the resistance R1 is small so that this drop can be neglected.

2.2.2. State Detecting Unit

The state detecting unit 11 includes a constant current source 40 and a voltage follower 41 so as to function as a voltage detecting unit. The constant current source 40 sends a constant current Icp into the detection cell 5. The voltage follower 41 detects the VS voltage Vs, and outputs this VS voltage Vs to the feedback controlling unit 12, the admittance detecting unit 17, and the abnormality detecting unit 20.

2.2.3. Feedback Controlling Unit

The feedback controlling unit 12 generates the control voltage Vcnt according to the VS voltage Vs detected by the state detecting unit 11, and outputs this control voltage Vcnt to the current supplying unit 13.

The feedback controlling unit 12 includes a switch 50, a capacitor 51, and a Proportional-Integral-Derivative (PID) control unit 52. The switch 50 connects therebetween the state detecting unit 11 and the PID control unit 52, and the capacitor 51 connects therebetween a ground GND and a connection point between the switch 50 and the PID control unit 52.

The switch 50 is turned on when the control voltage Vcnt according to the VS voltage Vs is generated. When the switch 50 is on, the PID control unit 52 performs Proportion and Integration and Derivation (PID) so that a difference between the VS voltage Vs and a predetermined reference voltage value Vref is zero or reduced, so as to generate the control voltage Vcnt according to the VS voltage Vs.

Thus, the feedback controlling unit 12 can output the control voltage Vcnt according to the difference between the VS voltage Vs and the reference voltage value Vref to the current supplying unit 13. Instead of the PID control unit 52, for example, a unit, which performs a Proportional-Integral (PI) control so that the difference between the VS voltage Vs and the reference voltage value Vref is zero or reduced, may be provided.

On the other hand, the switch 50 is turned off during a sweeping process (process for applying sweeping current Im to detection cell 5) executed by the sweep processing unit 16. When the switch 50 is turned off, a voltage of the capacitor 51 is a voltage according to the VS voltage Vs immediately before the switch 50 is turned off.

Therefore, the feedback controlling unit 12 outputs the control voltage Vcnt according to the VS voltage Vs immediately before the switch 50 is turned off, and the control voltage Vcnt does not change from immediately before the switch 50 is turned off. Thus, a feedback control according to a change in the VS voltage Vs is stopped. It is sufficient that the feedback controlling unit 12 has a configuration in which the feedback control according to the change in the VS voltage Vs is stopped during the sweeping process, and not limited to the configuration illustrated in FIG. 2.

2.2.4. Current Supplying Unit

The current supplying unit 13 includes resistances R4 to R8 and an operational amplifier OP2 so as to supply, from the IP terminal Tip to the pump cell 4 of the gas sensor element 1, the current Ip having a direction and a magnitude according to a difference between a reference voltage Vb and the control voltage Vcnt output from the feedback controlling unit 12. The current supplying unit 13 is not limited to the circuit illustrated in FIG. 2, and it is sufficient that the current supplying unit 13 has a configuration that can supply the current Ip according to a control by the feedback controlling unit 12 to a terminal T1.

2.2.5. Current Detecting Unit

The current detecting unit 14 detects a value of a both-end voltage Vr2 of the resistance R2 from a difference between the constant voltage Va and an output from the operational amplifier OP1 so as to detect the IP current IP (=Vr2/R2) from this value of the both-end voltage Vr2. It is sufficient that the current detecting unit 14 has a configuration that detects the IP current IP, and is not limited to the configuration illustrated in FIG. 2.

Not illustrated in FIG. 2, in the controller 3, a constant current source for sending the constant current Icp is provided at the COM terminal Tcom along with the constant current source 40, and the constant current Icp is not included in the IP current IP to be detected by the current detecting unit 14.

2.2.6. Air-Fuel-Ratio Computing Unit

The air-fuel-ratio computing unit 15 computes an air fuel ratio (A/F value) on the basis of the IP current IP detected by the current detecting unit 14.

2.2.7. Sweep Processing Unit

The sweep processing unit 16 applies the sweeping current Im, which is a constant current, to the detection cell 5 from a constant current source 42 through the VS terminal Tvs. This sweep processing unit 16 includes the constant current source 42 and a switch 43.

The constant current source 42 and the switch 43 are arranged so that they are serially connected between VS terminal Tvs and the ground GND. The switch 43 is intermittently turned on (for example, is turned on as long as predetermined time period TB at predetermined time period TA intervals), so that the sweeping current Im is intermittently applied to the detection cell 5 from the constant current source 42.

2.2.8. Admittance Detecting Unit

The admittance detecting unit 17 detects the admittance Y of the detection cell 5 on the basis of the VS voltage Vs detected by the state detecting unit 11.

For example, the admittance detecting unit 17 can detect the admittance Y ($=Im/\Delta V1$) on the basis of the change amount $\Delta V1$ of the VS voltage Vs generated by an application of the sweeping current Im to the detection cell 5. The admittance detecting unit 17 may detect, instead of the admittance Y, a value (for example, impedance Z of detection cell 5) corresponding to the admittance Y.

2.2.9. Heater Controlling Unit

The heater controlling unit 18 is connected with the heater wiring of the heater 2 provided in the gas sensor element 1 so as to control a power amount to be supplied to the heater 2 from a battery BAT. Thus, the temperature of the heater 2 is controlled. This heater controlling unit 18 includes a drive unit 46 and a switching element 47.

The drive unit 46 generates a driving signal for a duty ratio D according to a power amount to be supplied to the heater 2 so as to output this driving signal to the switching element 47. Thus, the switching element 47 is turned on and off in accordance with the duty ratio D of the driving signal, so that a power according to the duty ratio D is supplied to the heater 2 from the battery BAT.

This drive unit 46 adjusts the duty ratio D so that the admittance Y detected by the admittance detecting unit 17 is a predetermined value. For example, the drive unit 46 adjusts the duty ratio D so that the admittance Y accords with a reference value Yth, for example, a deviation in the admittance Y from the reference value Yth is zero or reduced by using a PI control or a PID control. Thus, the gas sensor element 1 can be activated, and the gas sensor element 1 can be kept in an activated state.

2.2.10. State Detecting Unit

The state detecting unit 19 includes a voltage follower 48 to function as a voltage detecting unit. The voltage follower 48 detects the IP voltage Vp, and outputs (reports) this IP voltage Vp to the abnormality detecting unit 20.

2.2.11. Abnormality Detecting Unit

The abnormality detecting unit 20 illustrated in FIG. 2 detects a fluctuation in the IP voltage Vp generated by an application of the sweeping current Im and the like, and detects whether or not a part between IP-VS is in a short-circuited state on the basis of this fluctuation in the IP voltage Vp.

Herein, a case is assumed in which a short circuit has occurred between IP-VS. When a short circuit has occurred between IP-VS, a value of the admittance Y, which is detected by the admittance detecting unit 17, rapidly increases, however, the heater controlling unit 18 controls the heater 2 so that the admittance Y detected by the admittance detecting unit 17 is a predetermined value. Therefore, even when the admittance Y rapidly increases, the heater 2 is subsequently controlled by the heater controlling unit 18 so that the admittance Y is a predetermined value.

Therefore, an abnormality detecting unit may be provided, which detects the timing when the admittance Y rapidly increases so as to detect that a short circuit has occurred between IP-VS. However, when the timing when the admittance Y rapidly increases is to be detected with high accuracy, a cycle length of a process that detects the admittance Y and a cycle length of a process that detects a change in the admittance Y are short, and thus processing loads of the admittance detecting unit 17 and the abnormality detecting unit 20 become large.

Meanwhile, in a state where a short circuit has occurred between IP-VS, when the sweeping current Im is applied to the detection cell 5, the IP voltage Vp changes in accordance with a change in the VS voltage Vs, and the IP current Ip changes in accordance with a change in the VS current Is. In other words, behaviors of the IP voltage Vp and the IP current Ip when the sweeping current Im is applied to the detection cell 5 differ between when a short circuit has occurred between IP-VS and when no short circuit has occurred between IP-VS.

Figure 4:
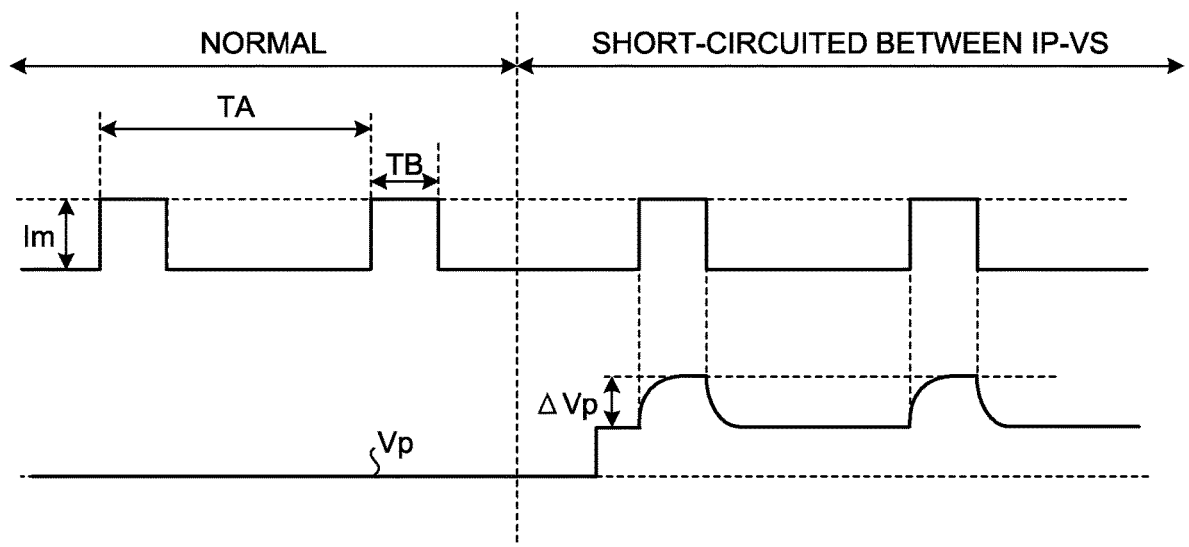
FIG. 4 is a diagram illustrating state changes in a sweeping current and an IP voltage from normal states when a short circuit occurs between a pump cell and a detection cell.

FIG. 4 is a diagram illustrating state changes in the sweeping current Im and the IP voltage Vp from normal states when a short circuit occurs between IP-VS. As illustrated in FIG. 4, the sweeping current Im is applied to the detection cell 5 from the sweep processing unit 16 through the VS terminal Tvs during the predetermined time period TB in each of the predetermined time periods TA. In a normal state, a state of an air fuel ratio changes among rich, lean, and stoichiometric, however in the example illustrated in FIG. 4, a state of an air fuel ratio is stoichiometric in a normal state.

When the sweeping current Im is supplied to the detection cell 5, as described above, a feedback control according to a change in the VS voltage Vs is stopped, and thus the control voltage Vcnt does not fluctuate. Therefore, in a normal state where no short-circuit has occurred between IP-VS, the IP voltage Vp is a constant voltage. On the other hand, when a short-circuit has occurred between IP-VS, because the IP terminal Tip and the VS terminal Tvs are connected with each other with a low resistance, as illustrated in FIG. 4, the IP voltage Vp is a voltage that is equal to the VS voltage Vs or a voltage corresponding to the VS voltage Vs.

Therefore, as described above, the abnormality detecting unit 20 determines whether or not a short circuit has occurred between IP-VS on the basis of an application of the sweeping current Im to the detection cell 5, in other words, a change amount ΔVp of the IP voltage Vp to be generated by a sweeping process. Thus, an abnormality of a short circuit between IP-VS can be detected with high accuracy while reducing a processing load.

In the example illustrated in FIG. 4, a voltage of the IP voltage Vp is in a lean side at a state where a short circuit has occurred between IP-VS, the abnormality detecting unit 20 detects a short circuit abnormality between IP-VS on the basis of, not the IP voltage Vp itself, but the change amount ΔVp of the IP voltage Vp. Therefore, the abnormality detecting unit 20 can detect an abnormality of a short circuit between IP-VS with high accuracy, whether the IP voltage Vp is in a lean side or a rich side.

Figure 5:
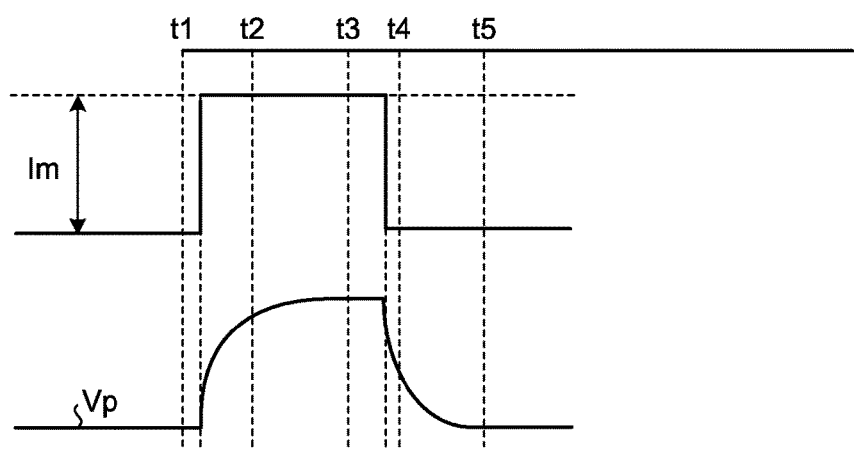
FIG. 5 is a diagram illustrating a process for detecting a change amount of an IP current.

FIG. 5 is a diagram illustrating a process for detecting the change amount ΔVp. The abnormality detecting unit 20 can detects, as the change amount ΔVp, a difference between the IP voltage Vp before a sweeping process (time t1) and that during the sweeping process (time t2, t3, or t4). The abnormality detecting unit 20 may detect, as the change amount ΔVp, a difference between the IP voltage Vp during the sweeping process (time t2, t3, or t4) and that after the sweeping process (time t5).

When using, as the change amount ΔVp, a difference between the IP voltage Vp before the sweeping process (time t1) and that rising by the sweeping process (time t2), an abnormality of a short circuit between IP-VS can be rapidly detected compared with a case where the IP voltage Vp after the rising (time t3) is used.

In the aforementioned example, a feedback control of the feedback controlling unit 12 is stopped, however, is not limited to this example. For example, the current supplying unit 13 is configured so that, in the sweeping, the control voltage Vcnt immediately before the sweeping is used by the current supplying unit 13 without stopping the feedback control performed by the feedback controlling unit 12.

A time period of the sweeping process may be extended longer than a feedback cycle length of the feedback controlling unit 12, or a feedback gain of the feedback controlling unit 12 may be reduced, in order to suppress an effect of the feedback process. Moreover, for example, a configuration may be employed in which a feedback gain of the feedback controlling unit 12 during the sweeping is smaller than that during the feedback control.

The abnormality detecting unit 20 can determine whether or not a short circuit has occurred between IP-VS on the basis of a ratio between the change amount ΔVp, which is a difference between two values of the IP voltage Vp, and a change amount ΔVs that is a difference between two values of the VS voltage Vs detected at respective timings that are similar to those of the two values of the IP voltage Vp.

For example, when a ratio ΔP1(=ΔVp/ΔVs) of the change amount ΔVp of the IP voltage Vp corresponding to the change amount ΔVs of the VS voltage Vs is a predetermined threshold value Pth1 or more, the abnormality detecting unit 20 can determine that a short circuit has occurred between IP-VS.

When a short circuit has occurred between IP-VS, the IP terminal Tip and the VS terminal Tvs are connected with each other with a low resistance, and thus the ratio ΔP1 of the change amount ΔVp to the change amount ΔVs is larger as a value of the resistance between the IP terminal Tip and the VS terminal Tvs is lower. Therefore, an abnormality of a short circuit between IP-VS can be detected with higher accuracy than a case where a short circuit between IP-VS is detected by only the change amount ΔVp of the IP voltage Vp.

In the aforementioned example, for each sweeping process by the sweep processing unit 16, a process for detecting the admittance Y by the admittance detecting unit 17 and a short-circuit-abnormality determining process between IP-VS by the abnormality detecting unit 20 are performed. Therefore, a sweeping process to be used in the process for detecting the admittance Y can be further used in the short-circuit-abnormality determining process, and thus a time period needed for the sweeping process can be more shortened than a case where sweeping processes are separately executed on the process for detecting the admittance Y and the short-circuit-abnormality determining process, respectively.

The sweep processing unit 16 may execute, at different timings, the sweeping process used in the process for detecting the admittance Y by the admittance detecting unit 17 and that used in the short-circuit-abnormality determining process between IP-VS by the abnormality detecting unit 20, respectively. Therefore, a short circuit abnormality between IP-VS can be detected at a timing other than that when the admittance Y is detected, and thus an accuracy in detecting a short circuit abnormality between IP-VS can be improved.

3. Second Configuration Example of Air-Fuel-Ratio Sensor

Figure 6:
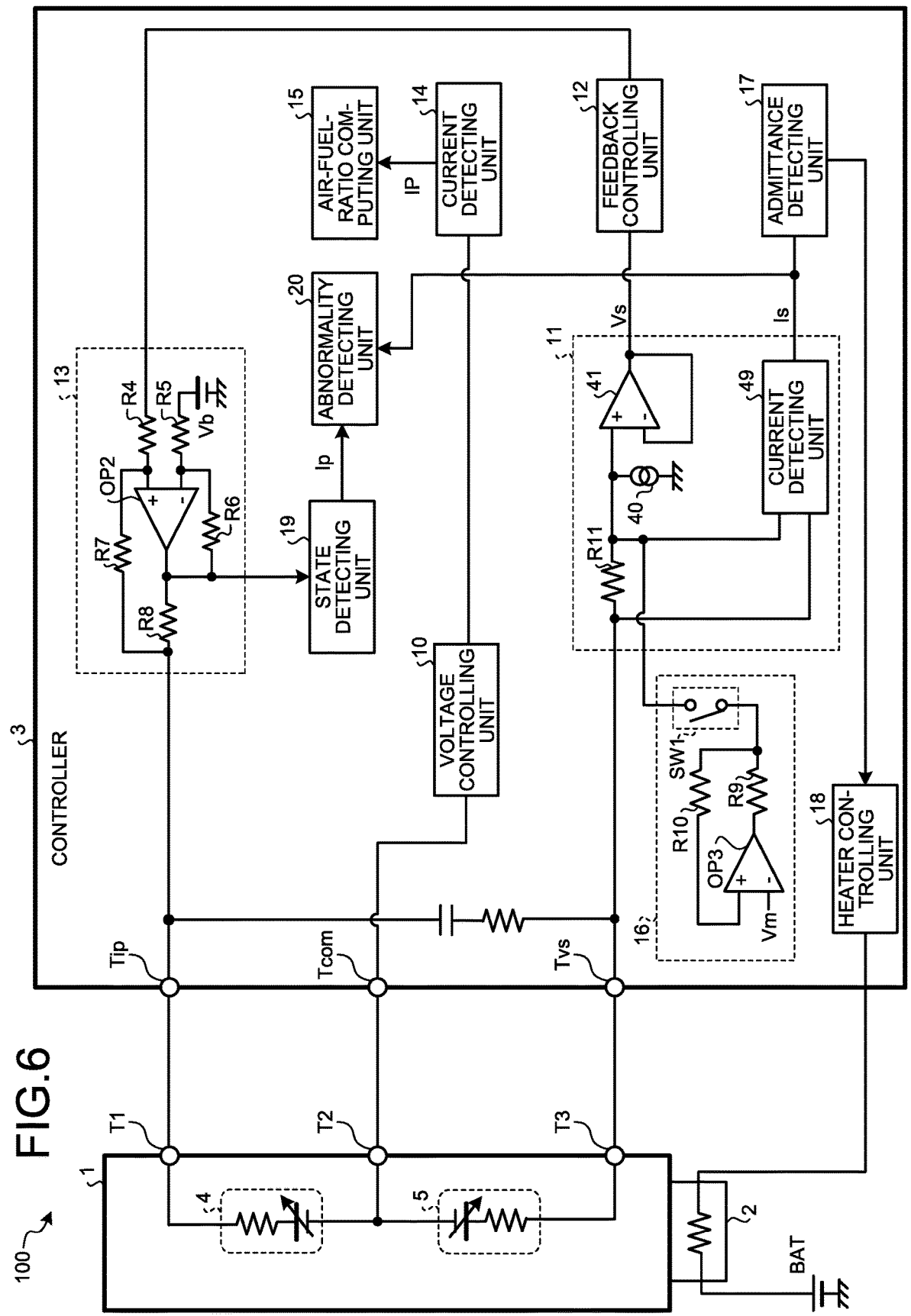
FIG. 6 is a diagram illustrating a second configuration example of the air-fuel-ratio sensor illustrated in FIG. 1.

Next, one example of a second configuration of the air-fuel-ratio sensor 100 illustrated in FIG. 1 will be explained. FIG. 6 is a diagram illustrating a second configuration example of the air-fuel-ratio sensor 100 illustrated in FIG. 1. Hereinafter, the state detecting unit 11, the sweep processing unit 16, the admittance detecting unit 17, the state detecting unit 19, and the abnormality detecting unit 20, which have configurations different from those of the respective corresponding units in the air-fuel-ratio sensor 100 illustrated in FIG. 2, will be explained, and an explanation of other configurations is omitted.

The air-fuel-ratio sensor 100 illustrated in FIG. 6 is different from that illustrated in FIG. 2 in that the air-fuel-ratio sensor 100 illustrated in FIG. 6 applies the sweeping voltage Vm to the VS terminal Tvs, detects a short circuit between IP-VS on the basis of a fluctuation in the IP current Ip (and fluctuation in VS current Is), and detects the admittance Y on the basis of the fluctuation in the VS current Is.

3.1. Sweep Processing Unit

The sweep processing unit 16 illustrated in FIG. 6 applies the sweeping voltage Vm, which is a constant voltage, to the VS terminal Tvs. This sweep processing unit 16 includes an operational amplifier OP3, resistances R9 and R10, and a switch SW1.

A voltage Vm is input to an inverting input terminal of the operational amplifier OP3, and one end of the resistance R9 is connected with an output terminal of the operational amplifier OP3. The resistance R10 connects therebetween a non-inverting input terminal of the operational amplifier OP3 and the other end of the resistance R9. Thus, the operational amplifier OP3 operates so that a voltage at the other end of the resistance R9 accords with the voltage Vm.

The switch SW1 is provided between the VS terminal Tvs and the other end of the resistance R9, and the switch SW1 is turned on during a sweeping process so as to apply the sweeping voltage Vm to the detection cell 5 through the VS terminal Tvs. It is sufficient that the sweep processing unit 16 has a configuration that applies the sweeping voltage Vm, which is a constant voltage, to the VS terminal Tvs, and is not limited to the configuration illustrated in FIG. 6.

3.2. State Detecting Unit

The state detecting unit 11 illustrated in FIG. 6 includes, similarly to that illustrated in FIG. 2, the constant current source 40 and the voltage follower 41 so as to function as a voltage detecting unit. Moreover, the state detecting unit 11 illustrated in FIG. 6 includes a resistance R11 and a current detecting unit 49.

The resistance R11 connects therebetween the VS terminal Tvs, and the sweep processing unit 16 and the constant current source 40. The current detecting unit 49 detects a value of a both-end voltage Vr3 of the resistance R11 so as to detect the VS current Is, which is an instantaneous value of the current Is flowing into the gas sensor element 1 from the VS terminal Tvs, on the basis of this value of the both-end voltage Vr3.

Because a current Icp of the constant current source 40 is a constant current, the current detecting unit 49 may have a configuration that detects a both-end voltage Vr4 of the resistance R9 so as to detect the VS current Is on the basis of the detected both-end voltage Vr4. It is sufficient that the state detecting unit 11 has a configuration that can detect the VS voltage Vs and the VS current Is, and is not limited to the configuration illustrated in FIG. 6.

3.3. Admittance Detecting Unit

The admittance detecting unit 17 detects the admittance Y of the detection cell 5 on the basis of the VS current Is detected by the state detecting unit 11. For example, the admittance detecting unit 17 can detect the admittance Y ($=\Delta I1/Vm$) on the basis of the change amount $\Delta I1$ of the VS current Is generated by an application of the sweeping current Im to the detection cell 5. The admittance detecting unit 17 may detect, instead of the admittance Y, a value (for example, impedance Z of detection cell 5) corresponding to the admittance Y.

3.4. State Detecting Unit

The state detecting unit 19 detects a value of the both-end voltage Vr4 of the resistance R8 from a difference between the reference voltage Vb and an output from the operational amplifier OP2 so as to detect the IP current Ip ($=Vr4/R8$) on the basis of this value of the both-end voltage Vr4. It is sufficient that the state detecting unit 19 has a configuration that detects the IP current Ip, and is not limited to the configuration illustrated in FIG. 6.

3.5. Abnormality Detecting Unit

The abnormality detecting unit 20 illustrated in FIG. 6 detects a fluctuation in the IP current Ip generated by an application of the sweeping voltage Vm and the like so as to detect whether or not a part between IP-VS is in a short-circuited state on the basis of this fluctuation in the IP current Ip.

When a short circuit has occurred between IP-VS, because the IP terminal Tip and the VS terminal Tvs are connected with each other with a low resistance, the pump cell 4 and the detection cell 5 are in a state where they are connected in parallel, and the sweeping voltage Vm is also applied to the pump cell 4. Therefore, when a short circuit between IP-VS has occurred, a fluctuation is generated in the IP current Ip by the sweeping voltage Vm.

Therefore, the abnormality detecting unit 20 illustrated in FIG. 6 determines whether or not a short-circuit has occurred between IP-VS on the basis of a change amount $\Delta Ip$ of the IP current Ip to be generated by an application of the sweeping voltage Vm to the detection cell 5, in other words, a sweeping process. Thus, an abnormality of a short circuit between IP-VS can be detected with high accuracy while reducing a processing load.

In the abnormality detecting unit 20 illustrated in FIG. 6, timings, when two values of the IP current Ip to be used for a detection of the change amount ΔIp are detected, are the same as those (for example, any two of times t1 to t5) when the two values of the IP voltage Vp to be used for a detection of the change amount ΔVp by the abnormality detecting unit 20 illustrated in FIG. 2 are detected.

The abnormality detecting unit 20 can determine whether or not a short circuit has occurred between IP-VS on the basis of a ratio between the change amount ΔIp, which is a difference between two values of the two IP current Ip, and a change amount ΔIs that is a difference between two values of the VS current Is detected at respective timings similar to those of the two values of the IP current Ip.

For example, when a ratio ΔP2 (=ΔIs/ΔIp) of the change amount ΔIp of the IP current Ip to the change amount ΔIs of the VS current Is is a predetermined threshold value Pth2 or more, the abnormality detecting unit 20 can determine that a short circuit has occurred between IP-VS. Thus, an abnormality of a short circuit between IP-VS can be detected with higher accuracy than a case where the short circuit between IP-VS is detected by only the change amount ΔIp of the IP current Ip.

4. Abnormality Determining Process Flow of Abnormality Detecting Unit

Figure 7:
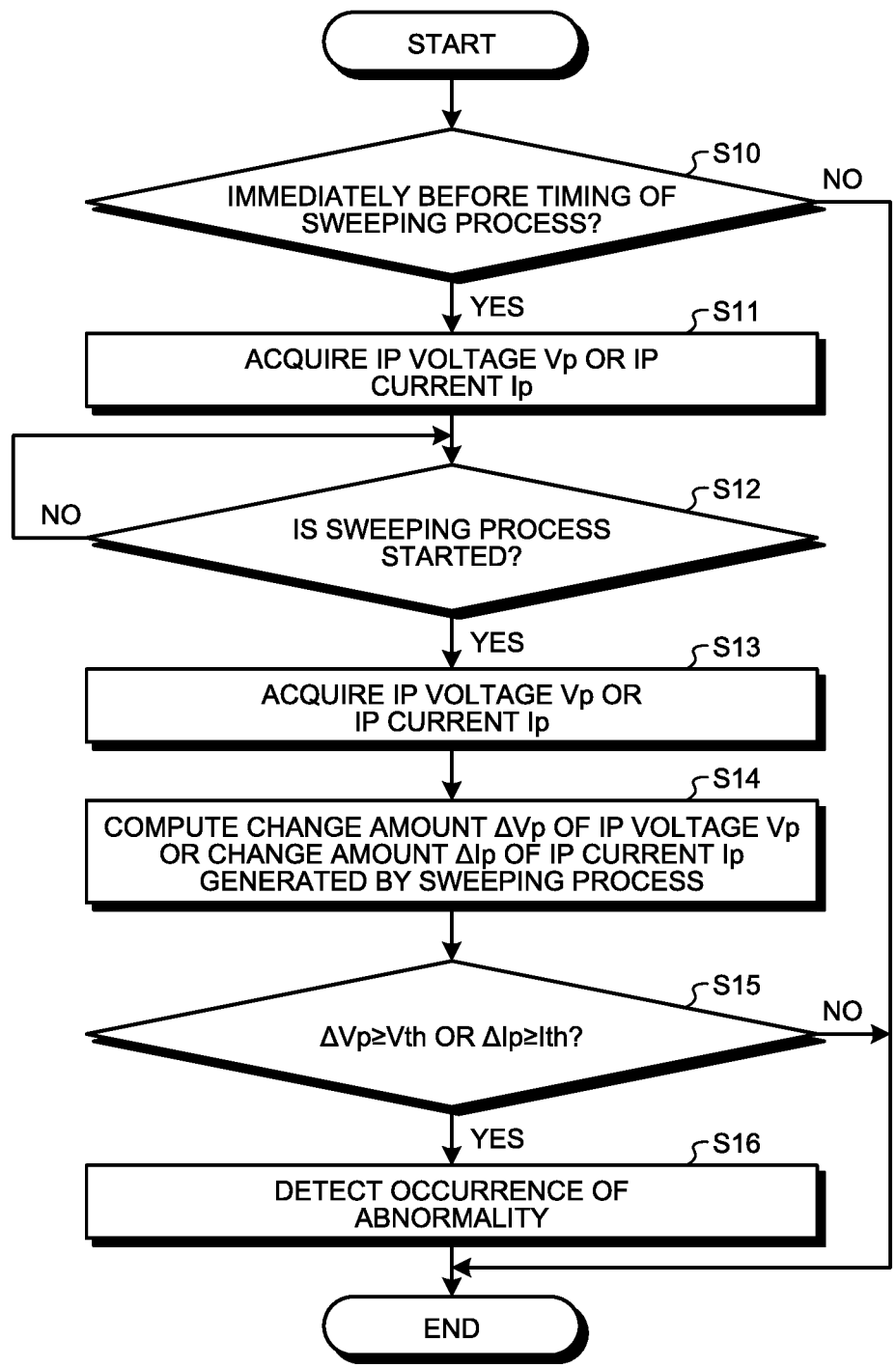
FIG. 7 is a flowchart illustrating a first abnormality detecting procedure to be performed by a controller.

Next, one example of an abnormality determining process flow of the abnormality detecting unit 20 will be explained by using a flowchart. FIG. 7 is a flowchart illustrating one example of a first abnormality detecting procedure to be performed by the abnormality detecting unit 20, and the process is repeatedly executed.

As illustrated in FIG. 7, the abnormality detecting unit 20 determines whether or not it is an immediately before timing (hereinafter, may be referred to as "immediately-before sweep timing") of a sweeping process by the sweep processing unit 16 (Step S10). When determining that it is an immediately-before sweep timing (Step S10: Yes), the abnormality detecting unit 20 acquires the IP voltage Vp or the IP current Ip detected by the state detecting unit 19 at the immediately-before sweep timing (Step S11).

Next, the abnormality detecting unit 20 determines whether or not the sweeping process by the sweep processing unit 16 is started (Step S12). When the sweeping process is determined to be started (Step S12: Yes), the IP voltage Vp or the IP current Ip detected by the state detecting unit 19 is acquired at a predetermined timing (for example, any one of times t2 to t4 illustrated in FIG. 5) after the sweeping process is started (Step S13).

The abnormality detecting unit 20 computes the change amount ΔVp of the IP voltage Vp or the change amount ΔIp of the IP current Ip generated by the sweeping process (Step S14). This computation of the change amount ΔVp is performed by computing a difference between the IP voltage Vp acquired in Step S11 and the IP voltage Vp acquired in Step S13. The computation of the change amount ΔIp is performed on the basis of values of the IP current Ip acquired in respective Steps S11 and S13.

The abnormality detecting unit 20 determines whether or not the change amount ΔVp is a threshold value Vth or more, or the change amount ΔIp is a threshold value Ith or more (Step S15). When the change amount ΔVp is the threshold value Vth or more, or when the change amount ΔIp is the threshold value Ith or more (Step S15: Yes), the abnormality detecting unit 20 determines that an abnormality of a short circuit has occurred between IP-VS (Step S16).

In Step S10, when determining that it is not a timing immediately before the sweeping process (Step S10: No), when ΔVp≥Vth and ΔIp≥Ith are not satisfied (Step S15: No), or when the process of Step S16 has completed, the abnormality detecting unit 20 terminates the processes illustrated in FIG. 7, and executes the processes from the process of Step S10 at a next processing timing.

The abnormality detecting unit 20 may compute the change amount ΔVp and the change amount ΔIp, when the change amount ΔVp is the threshold value Vth or more and further the change amount ΔIp is the threshold value Ith or more, may determine that an abnormality of a short circuit has occurred between IP-VS.

Figure 8:
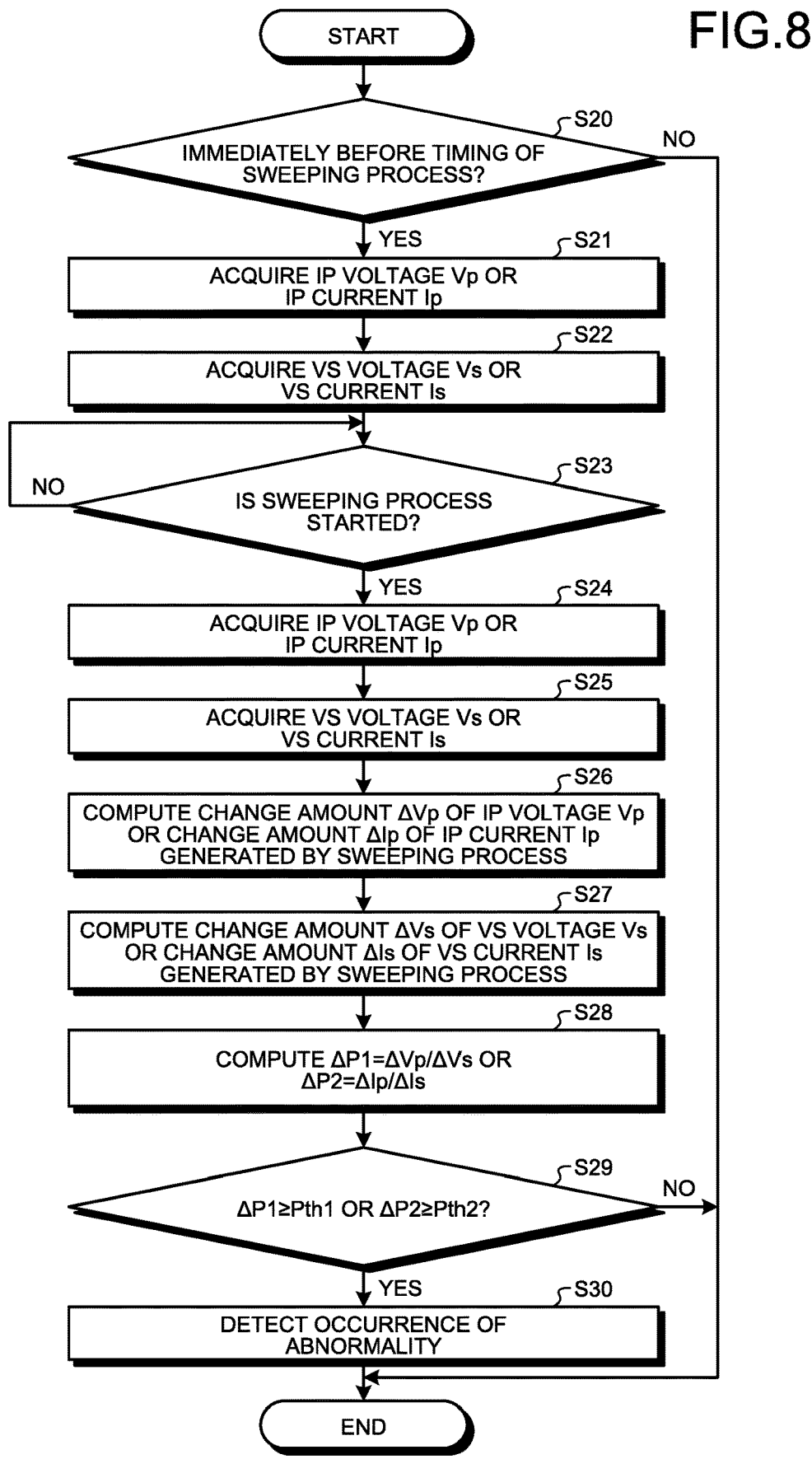
FIG. 8 is a flowchart illustrating a second abnormality detecting procedure to be performed by the controller.

FIG. 8 is a flowchart illustrating one example of a second abnormality detecting procedure to be performed by the abnormality detecting unit 20, and the process is repeatedly executed. Processes of Steps S20, S21, S23, S24, and S26 illustrated in FIG. 8 are the same as those of Steps S10 to S14 illustrated in FIG. 7, and thus an explanation thereof is omitted.

In Step S22, the abnormality detecting unit 20 acquires the VS voltage Vs or the VS current Is detected by the state detecting unit 11 at an immediately-before sweep timing. In Step S25, the abnormality detecting unit 20 acquires the VS voltage Vs or the VS current Is detected by the state detecting unit 11 at a predetermined timing (for example, any one of times t2 to t4 illustrated in FIG. 5) after the sweeping process is started.

The abnormality detecting unit 20 computes the change amount ΔVs of the VS voltage Vs or the change amount ΔIs of the VS current Is generated by the sweeping process (Step S27). This computation of the change amount ΔVs is performed by computing a difference between the VS voltage Vs acquired in Step S22 and the VS voltage Vs acquired in Step S25. The computation of the change amount ΔIs is performed on the basis of the VS current Is acquired in Step S22 and the VS current Is acquired in Step S25.

Next, the abnormality detecting unit 20 computes the ratio ΔP1 (=ΔVp/ΔVs) of the change amount ΔVp to the change amount ΔVs, or the ratio ΔP2 (=ΔIp/ΔIs) of the change amount ΔIp to the change amount ΔIs (Step S28). The abnormality detecting unit 20 determines whether or not the ratio ΔP1 is the threshold value Pth1 or more, or whether or not the ratio ΔP2 is the threshold value Pth2 or more (Step S29).

When the ratio ΔP1 is the threshold value Pth1 or more, or when the ratio ΔP2 is the threshold value Pth2 or more, the abnormality detecting unit 20 determines that an abnormality of a short circuit has occurred between IP-VS (Step S30).

When determining that it is not the timing immediately before the sweeping process in Step S20 (Step S20: No), when the ratio ΔP is not the threshold value Pth or more (Step S29: No), or when the process of Step S30 has completed, the abnormality detecting unit 20 terminates the processes illustrated in FIG. 8.

Moreover, when the ratio ΔP1 is the threshold value Pth1 or more and the ratio ΔP2 is the threshold value Pth2 or more, the abnormality detecting unit 20 may determine that an abnormality of a short circuit has occurred between IP-VS.

Moreover, the controller 3 illustrated in FIG. 2 may have a configuration that determines whether or not a part between IP-VS is short-circuited on the basis of, instead of the change amount ΔVp of the IP voltage Vp generated by the sweeping current Im, the change amount ΔIp of the IP current Ip generated by the sweeping current Im. Moreover, the controller 3 illustrated in FIG. 6 may have a configuration that determines whether or not the part between IP-VS is short-circuited on the basis of, instead of the change amount ΔIp of the IP current Ip generated by the sweeping voltage Vm, the change amount ΔVp of the IP voltage Vp generated by the sweeping voltage Vm.

As described above, the air-fuel-ratio sensor 100 includes the gas sensor element 1 and the controller 3. The gas sensor element 1 includes the pump cell 4 that pumps and pumps out oxygen into and from the gas detecting chamber 90 and the detection cell 5 for detecting an oxygen concentration in the gas detecting chamber 90. The controller 3 includes the current supplying unit 13, the sweep processing unit 16, and the abnormality detecting unit 20. The current supplying unit 13 supplies the current Ip to the pump cell 4 through the IP terminal Tip (one example of "first terminal") connected with the pump cell 4 so as to control the pump cell 4. The sweep processing unit 16 applies the sweeping voltage Vm (one example of predetermined voltage) or the sweeping current Im (one example of "predetermined current") to the detection cell 5 through the VS terminal Tvs (one example of "second terminal") connected with the detection cell 5 so as to execute a sweeping process that changes the voltage Vs and the current Is of the detection cell 5. The abnormality detecting unit 20 detects a short-circuited state between the IP terminal Tip and the VS terminal Tvs on the basis of a fluctuation in the voltage Vp or the current Ip, generated by the sweeping process, of the IP terminal Tip. Thus, an abnormality of a short circuit between IP-VS can be detected with high accuracy while reducing a processing load.

The controller 3 further includes the feedback controlling unit 12 that outputs, to the current supplying unit 13, the control voltage Vcnt (one example of "controlling signal") according to the voltage Vs of the VS terminal Tvs so as to perform a feedback control. This feedback controlling unit 12 stops the feedback control when the sweeping process is executed by the sweep processing unit 16. Thus, a change in the control voltage Vcnt according to a fluctuation in the voltage Vs of the VS terminal Tvs by the sweeping process is suppressed, and thus a fluctuation in the voltage Vp of the IP terminal Tip can be suppressed, so that it is possible to detect an abnormality of a short circuit between IP-VS with higher accuracy.

The abnormality detecting unit 20 detects the short-circuited state between IP-VS on the basis of a ratio (for example, "ratio ΔP1" or "ratio ΔP2") between the fluctuation in the voltage Vp or the current Ip, generated by the sweeping process of the sweep processing unit 16, of the IP terminal Tip and a fluctuation in the voltage Vs or the current Is, generated by the sweeping process of the sweep processing unit 16, of the VS terminal Tvs. Thus, an abnormality of a short circuit between IP-VS can be detected with higher accuracy than a case where the short-circuit between IP-VS is detected by only the fluctuation in the voltage Vp or the current Ip.

The controller 3 further includes the admittance detecting unit 17 that detects a state of the admittance Y of the detection cell 5 on the basis of the fluctuation in the voltage Vs or the current Is, generated by the sweeping process of the sweep processing unit 16, of the VS terminal Tvs. Thus, the sweeping process used in the process for detecting the admittance Y can be also used in the short-circuit-abnormality determining process, and thus a time period needed for the sweeping process can be more shortened than a case where sweeping processes are separately executed on the process for detecting the admittance Y and the short-circuit-abnormality determining process, respectively.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A controller of an air-fuel-ratio sensor that includes a gas sensor element, the gas sensor element including a pump cell that pumps in and pumps out oxygen into and from a gas detecting chamber and a detection cell for detecting an oxygen concentration in the gas detecting chamber, the controller comprising a processor configured to:
   cause a current to be supplied to the pump cell through a first terminal connected with the pump cell so as to control the pump cell;
   cause to be executed a sweeping process in which a predetermined voltage or a predetermined current is applied to the detection cell through a second terminal connected with the detection cell so as to change a voltage and a current of the detection cell; and
   detect a short-circuited state between the first terminal and the second terminal based on a fluctuation in a voltage- or a current, generated by the sweeping process, of the first terminal.

2. The controller of the air-fuel-ratio sensor according to claim 1, wherein the processor is further configured to:
   output a controlling signal according to the voltage of the second terminal so as to perform a feedback control, and
   stop the feedback control when the sweeping process is executed.

3. The controller of the air-fuel-ratio sensor according to claim 1, wherein the processor is further configured to detect the short-circuited state between the first terminal and the second terminal based on a ratio between the fluctuation in the voltage or the current, generated by the sweeping process, of the first terminal and a fluctuation in the voltage or the current, generated by the sweeping process, of the second terminal.

4. The controller of the air-fuel-ratio sensor according to claim 1, wherein the processor is further configured to detect a state of an admittance of the detection cell based on a fluctuation in the voltage or the current, generated by the sweeping process, of the second terminal.

5. An abnormality detecting method of an air-fuel-ratio sensor that includes a gas sensor element, the gas sensor element including a pump cell that pumps in and pumps out oxygen into and from a gas detecting chamber and a detection cell for detecting an oxygen concentration in the gas detecting chamber, the method comprising:
   supplying a current to the pump cell through a first terminal connected with the pump cell so as to control the pump cell;
   executing a sweeping process in which a predetermined voltage or a predetermined current is applied to the detection cell through a second terminal connected with the detection cell so as to change a voltage and a current of the detection cell; and
   detecting a short-circuited state between the first terminal and the second terminal based on a fluctuation in a voltage or a current, generated by the sweeping process, of the first terminal.

* * * * *